United States Patent
Dujari et al.

(10) Patent No.: US 8,645,716 B1
(45) Date of Patent: Feb. 4, 2014

(54) METHOD AND APPARATUS FOR OVERWRITING AN ENCRYPTION KEY OF A MEDIA DRIVE

(75) Inventors: Vineet Dujari, Fremont, CA (US); Tze Lei Poo, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 51 days.

(21) Appl. No.: 13/252,416

(22) Filed: Oct. 4, 2011

Related U.S. Application Data

(60) Provisional application No. 61/391,498, filed on Oct. 8, 2010.

(51) Int. Cl.
- G06F 12/14 (2006.01)
- H04L 29/06 (2006.01)
- G08B 29/00 (2006.01)
- H04L 9/00 (2006.01)
- G06F 12/00 (2006.01)

(52) U.S. Cl.
USPC ............. 713/193; 713/165; 713/194; 726/34; 711/100; 711/164; 711/167; 380/277

(58) Field of Classification Search
USPC ............. 713/193, 165, 194; 726/34; 380/277; 711/100, 164, 167
See application file for complete search history.

(56) References Cited

U.S. PATENT DOCUMENTS

| | | | |
|---|---|---|---|
| 5,467,398 A | 11/1995 | Pierce et al. | |
| 5,469,506 A | 11/1995 | Berson et al. | |
| 5,479,514 A | 12/1995 | Klonowski | |
| 5,991,519 A * | 11/1999 | Benhammou et al. | 726/3 |
| 6,216,230 B1 | 4/2001 | Rallis et al. | |
| 6,389,538 B1 | 5/2002 | Gruse et al. | |
| 6,473,861 B1 | 10/2002 | Stokes | |
| 6,799,271 B2 | 9/2004 | Kugai | |
| 7,010,808 B1 | 3/2006 | Leung et al. | |
| 7,035,827 B2 | 4/2006 | Ezaki | |
| 7,036,018 B2 * | 4/2006 | Horvat et al. | 713/189 |
| 7,117,352 B1 * | 10/2006 | Giles et al. | 713/2 |
| 7,206,940 B2 | 4/2007 | Evans et al. | |
| 7,210,038 B2 | 4/2007 | Walmsley | |
| 7,370,349 B2 | 5/2008 | Holvey et al. | |
| 7,373,506 B2 | 5/2008 | Asano et al. | |
| 7,376,976 B2 | 5/2008 | Fierstein et al. | |
| 7,511,636 B2 | 3/2009 | Takahashi | |
| 7,522,726 B2 | 4/2009 | Ishiguro et al. | |
| 7,536,558 B2 | 5/2009 | Neble et al. | |
| 7,549,056 B2 | 6/2009 | Carr | |

(Continued)

OTHER PUBLICATIONS

"Non-Final Office Action", U.S. Appl. No. 12/125,670, (Jun. 4, 2012), 12 pages.

(Continued)

Primary Examiner — Aravind Moorthy

(57) ABSTRACT

The present disclosure describes apparatuses and techniques for fail-safe key zeroization. In some aspects a periodic counter is activated that is configured to indicate an amount of time that content of a one-time-programmable (OTP) memory is accessible and overwriting of the content of the OTP is caused when the periodic counter reaches a predetermined value effective to zeroize the content. In other aspects a periodic counter is started in response to a power event and one or more encryption keys stored in OTP memory are zeroized if an indication of media drive security is not received within a predetermined amount of time.

18 Claims, 6 Drawing Sheets

(56) References Cited

U.S. PATENT DOCUMENTS

| | | |
|---|---|---|
| 7,676,040 B2 | 3/2010 | Augenstein et al. |
| 7,725,738 B1 | 5/2010 | Langhammer et al. |
| 7,743,260 B2 | 6/2010 | Fetik |
| 7,865,733 B2 | 1/2011 | Goto et al. |
| 7,900,060 B2 | 3/2011 | Hodzic |
| 7,991,943 B2 | 8/2011 | Berenbaum et al. |
| 8,117,478 B2 | 2/2012 | Liu et al. |
| 8,423,789 B1 | 4/2013 | Poo et al. |
| 2002/0065834 A1* | 5/2002 | Wiggen et al. ............... 707/200 |
| 2003/0188162 A1 | 10/2003 | Candelore et al. |
| 2004/0030909 A1 | 2/2004 | Sako et al. |
| 2004/0184343 A1* | 9/2004 | Roohparvar et al. ......... 365/233 |
| 2004/0187001 A1 | 9/2004 | Bousis |
| 2004/0257462 A1 | 12/2004 | Goris et al. |
| 2005/0114686 A1 | 5/2005 | Ball et al. |
| 2005/0144468 A1 | 6/2005 | Northcutt et al. |
| 2005/0210290 A1* | 9/2005 | Ono et al. ..................... 713/201 |
| 2006/0059372 A1* | 3/2006 | Fayar et al. ................... 713/192 |
| 2006/0090084 A1 | 4/2006 | Buer |
| 2006/0117177 A1* | 6/2006 | Buer ............................. 713/155 |
| 2006/0209595 A1* | 9/2006 | Newell .................... 365/185.04 |
| 2006/0233149 A1 | 10/2006 | Rustagi et al. |
| 2006/0285686 A1 | 12/2006 | Van Den Heuvel et al. |
| 2007/0150756 A1 | 6/2007 | Kudelski |
| 2007/0180271 A1 | 8/2007 | Hatakeyama et al. |
| 2008/0043508 A1* | 2/2008 | Chao et al. ....................... 365/94 |
| 2008/0082837 A1 | 4/2008 | Mattsson |
| 2008/0091944 A1 | 4/2008 | von Mueller et al. |
| 2009/0024846 A1 | 1/2009 | Ganesan et al. |
| 2010/0039864 A1* | 2/2010 | Sarin et al. ............... 365/185.22 |

OTHER PUBLICATIONS

"Final Office Action", U.S. Appl. No. 12/125,670 (May 24, 2011), 11 pages.

"Final Office Action", U.S. Appl. No. 12/125,693, (Jun. 9, 2011), 9 pages.

"Non-Final Office Action", U.S. Appl. No. 12/125,670, (Dec. 13, 2011), 11 pages.

"Non-Final Office Action", U.S. Appl. No. 12/125,670, (Dec. 7, 2010), 9 pages.

"Non-Final Office Action", U.S. Appl. No. 12/125,693, (Oct. 3, 2011), 7 pages.

"Non-Final Office Action", U.S. Appl. No. 12/125,693, (Dec. 20, 2010), 7 pages.

Anderson, Dave "HDD Based Full Disc Encryption", *In Proceedings of THIC Conference 2006*, (Mar. 2006), 12 pages.

"Notice of Allowance", U.S. Appl. No. 12/125,670, Dec. 11, 2012, 8 pages.

"Non-Final Office Action", U.S. Appl. No. 13/683,056, Nov. 8, 2013, 5 pages.

"Non-Final Office Action", U.S. Appl. No. 13/598,282, Oct. 16, 2013, 6 pages.

"Non-Final Office Action", U.S. Appl. No. 13/863,079, Oct. 1, 2013, 9 pages.

"Notice of Allowance", U.S. Appl. No. 13/657,511, Nov. 4, 2013, 9 pages.

\* cited by examiner

METHOD AND APPARATUS FOR OVERWRITING AN ENCRYPTION KEY OF A MEDIA DRIVE

RELATED APPLICATIONS

This present disclosure claims priority to U.S. Provisional Patent Application Ser. No. 61/391,498 filed Oct. 8$^{th}$, 2010, the disclosure of which is incorporated by reference herein in its entirety.

BACKGROUND

The background description provided herein is for the purpose of generally presenting the context of the disclosure. Unless otherwise indicated herein, the approaches described in this section are not prior art to the claims in this application and are not admitted to be prior art by inclusion in this section.

Secure-computing devices often employ encryption mechanisms for communicating and storing data. Typically, data is stored to a media drive, such as a hard-disk drive or solid-state drive having self-encryption capabilities. These self-encrypting media drives typically contain encryption keys for encrypting and decrypting the data accessed by the secure-computing device. Once the encryption keys are loaded during provisioning of the media drive, the keys can be stored by the media drive until the end of life of the media drive. At the end of life of a media drive (e.g., due to component failure or expiration of a specified service life), the encryption keys are typically cleared from the media drive or the media drive is destroyed to ensure that any remaining data within the media drive cannot be accessed by an unauthorized entity. Clearing the encryption keys, however, may not be possible when a controller or link component of the media drive fails, in which case, the media drive itself must be destroyed. The process of physically destroying a media drive can be extremely expensive and time consuming, as stringent security protocols often require the use of costly equipment and strict supervision of the process to ensure complete destruction of the media drive.

SUMMARY

This summary is provided to introduce subject matter that is further described below in the Detailed Description and Drawings. Accordingly, this Summary should not be considered to describe essential features nor used to limit the scope of the claimed subject matter.

A method is described for activating a periodic counter, the periodic counter configured to indicate an amount of time that content of a one-time-programmable (OTP) memory is accessible, and causing, responsive to the periodic counter reaching a predetermined value, the content of the OTP memory to be overwritten effective to zeroize (or overwrite) the content.

Another method is described for starting a periodic counter in response to a power event of a media drive, the periodic counter configured to indicate an amount of time that one or more encryption keys stored in OTP memory of the media drive are accessible, and zeroizing the one or more encryption keys stored in the OTP memory if an indication of media drive security is not received within a predetermined amount of time.

A System-on-Chip (SoC) is described that is configured to activate a periodic counter in response to a power event within an operational environment of the SoC, and cause, when the periodic counter reaches a predetermined value, encryption keys stored in the OTP memory to be overwritten effective to zeroize the encryption keys, or prevent the encryption keys stored in the OTP memory from being overwritten in response to receiving an indication that the operational environment of SoC is secure.

The details of one or more implementations are set forth in the accompanying drawings and the description below. Other features and advantages will be apparent from the description and drawings, and from the claims.

BRIEF DESCRIPTION OF THE DRAWINGS

In the figures, the left-most digit of a reference number identifies the figure in which the reference number first appears. The use of the same reference numbers throughout the description and the figures indicate like elements.

DETAILED DESCRIPTION

Conventional techniques for electronically clearing encryption keys of a secure media drive typically require an active communication link and/or a functional media controller. When these components of a secure media drive are not available or not functioning, the secure media drive must be physically destroyed to ensure that data is not accessible. The process of physically destroying a secure media drive, however, is generally expensive and time consuming as the process often involves specialized equipment and strict supervision of the process for verification purposes. This disclosure describes apparatuses and techniques that allow encryption keys of a secure media drive to be zeroized and/or verified as being zeroized (or overwritten) when components or a communication link of the secure media drive fails.

The following discussion describes an operating environment, techniques that may be employed in the operating environment, and a System-on-Chip (SoC) in which components of the operating environment can be embodied. In the discussion below, reference is made to the operating environment by way of example only.

Operating Environment

Figure 1:
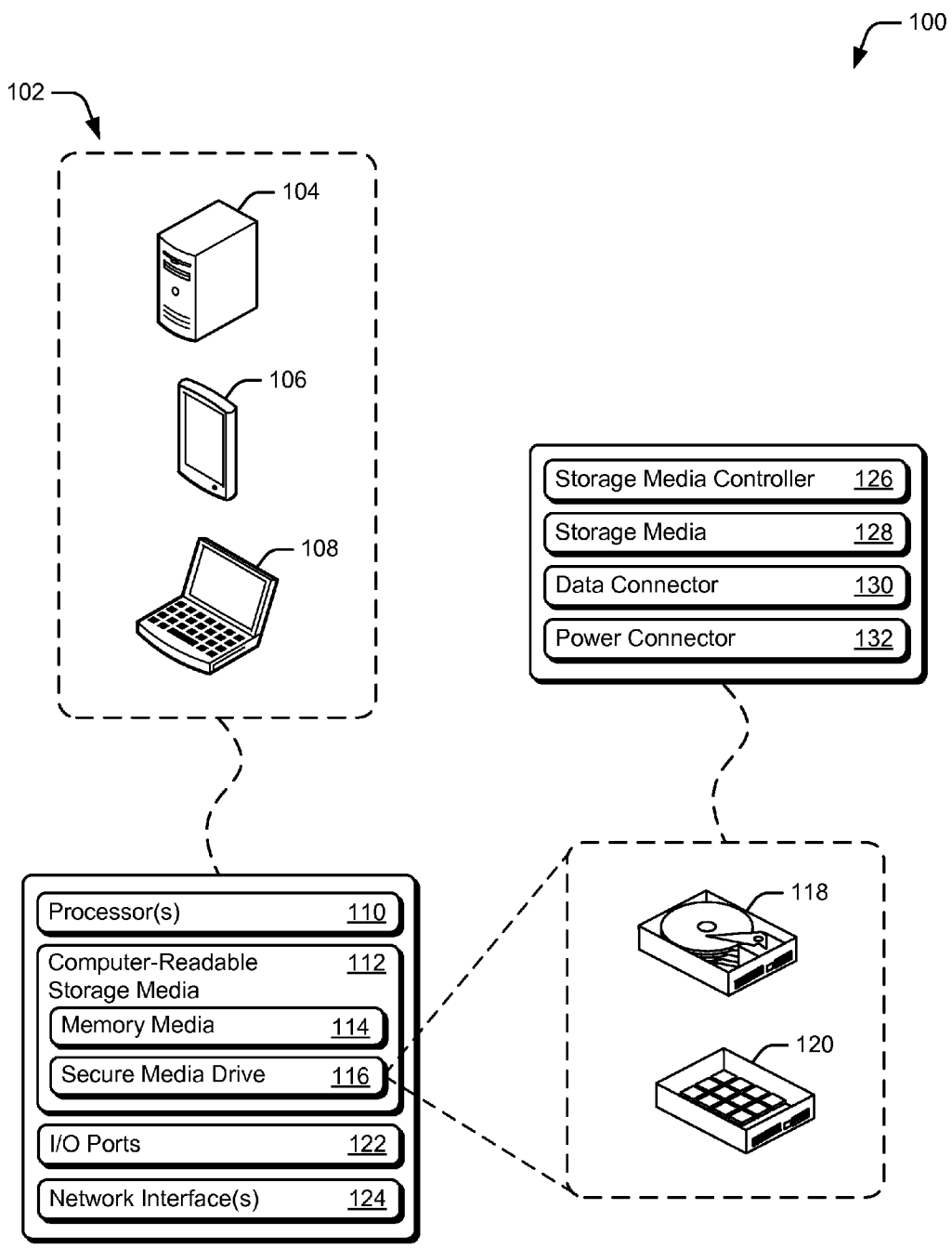
FIG. 1 illustrates an operating environment having secure-computing devices in accordance with one or more aspects.

FIG. 1 illustrates an example operating environment 100 having a computing device 102, which is capable of securely communicating and/or storing encrypted data. Examples of a computing device 102 include a server 104, a tablet computer 106, or a laptop computer 108. Further examples of a computing device 102 include a desktop computer, a smart phone, a set-top-box, an embedded communication device, a data storage appliance (e.g., network-attached storage), and so on. Computing device 102 is capable of communicating or storing data in accordance with a variety of security standards, e.g., Advanced Encryption Standard (AES), Federal Processing Information Standard (FIPS) 197, Triple Data Encryption Algorithm (TDES), FIPS 185 (Skipjack), Rivest, Shamir, and Adleman (RSA), and so on. For instance, server 104 may encrypt and store data received from another device or user by implementing a TDES block cipher.

Computing device 102 includes processor(s) 110 and computer-readable storage media 112. Computer-readable storage media 112 may include any type and/or combination of suitable storage media, such as memory media 114 and secure media drive 116. Memory media 114 may include memory such as dynamic random-access memory (DRAM), read-only memory (ROM), or Flash memory (not shown) useful to store data of applications and/or an operating system of computing device 102. Secure media drive 116 may include hard-disk drive 118 and/or solid-state drive 120 capable of encrypting and/or decrypting data, which are described in more detail below. In some cases, this data is useful to an operating system and/or applications of computing device 102. Processor(s) 110 can be any suitable type of processor, either single-core or multi-core, for executing instructions or commands of the operating system or applications of computing device 102.

Computing device 102 may also include I/O ports 122 and network interface(s) 124. I/O ports 122 allow computing device 102 to interact with other devices and/or users. I/O ports 122 may include any combination of internal or external ports, such as audio inputs and outputs, USB ports, Serial ATA (SATA) ports, PCI-express based ports or card-slots, and/or other legacy ports. Various peripherals may be operatively coupled with I/O ports 122, such as human-input devices (HIDs), external computer-readable storage media, or other peripherals.

Network interface(s) 124 provides connectivity to one or more networks and other devices connected therewith. Data communicated over network interfaces 124 may be encrypted or unencrypted depending on the environment in which computing device 102 is operating. Network interfaces 124 may include wired interfaces, such as Ethernet or fiber optic interfaces for communicated over a local network, intranet, or the Internet. Network interfaces 124 may also include wireless interfaces that facilitate communication over wireless networks, such as wireless LANs, cellular networks, and/or wireless personal-area-networks (WPANs).

Secure media drive 116, shown as hard-disk drive 118 and/or solid-state drive 120, here includes a storage media controller 126 and storage media 128. Generally, storage media controller 126 enables computing device 102 to access contents of storage media 128, such as encrypted data for applications or other services. Components of storage media controller 126 and how the components are implemented and used varies and are described below. Storage media 128 stores data of computing device 102, which is typically encrypted or re-encrypted before being written to storage media 128. Storage media 128 may include solid-state memory devices in the case of a solid-state drive (e.g., Flash memory modules or chip) or magnetic-media disks in the case of a hard-disk drive. Secure media drive 116 also includes data connector 130 and power connector 132, which may be separate (shown) or combined (not shown).

Figure 2:
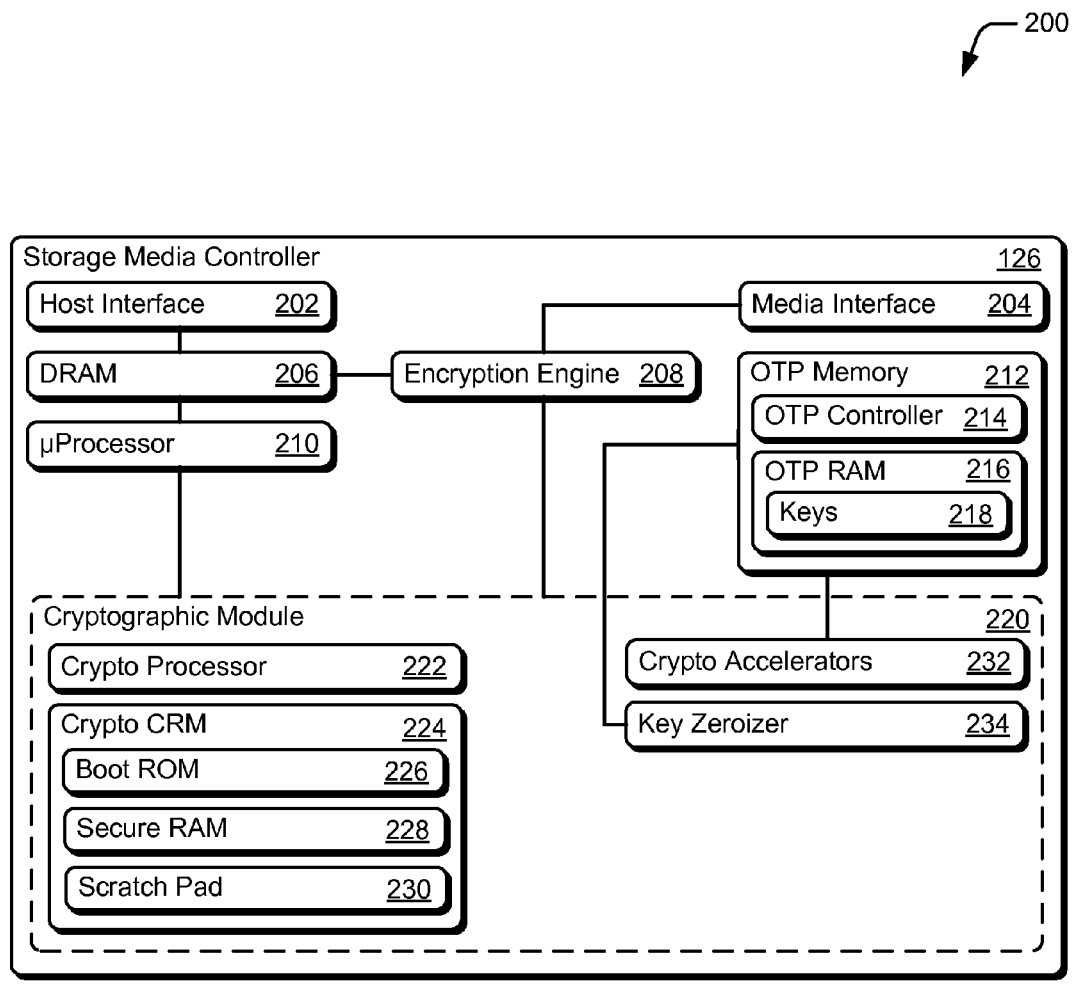
FIG. 2 illustrates a detailed aspect of an example storage media controller shown in FIG. 1.

FIG. 2 illustrates a detailed example of a storage media controller 126 capable of encrypting and/or decrypting data in accordance with various security standards. Storage media controller 126 includes host interface 202 (e.g., serial advanced technology attachment (SATA)) for communicating with a host secure-computing device 102 and media interface 204 for accessing storage media 128. Storage media controller 126 also includes DRAM 206, encryption engine 208, microprocessor 210 (μprocessor 210), and one-time-programmable (OTP) memory 212.

DRAM 206 may be used to buffer data received from a host device, which can then be processed by μprocessor 210 or encrypted by encryption engine 208. Alternately or additionally, DRAM 206 may be used to buffer data received from μprocessor 210 or decrypted by encryption engine 208 before transmission to the host device. Generally, μprocessor 210 may execute code or instructions enabling a host device to access data of storage media 128.

OTP memory 212 includes OTP controller 214 and OTP RAM 216. OTP controller 214 may write encryption keys 218 (keys 218) to OTP RAM 216 when secure media drive 116 is provisioned. Keys 218 may then be used by encryption engine 208 for encrypting or decrypting data. The encryption keys may be provided by any suitable source such an end customer, distributor, or generated by any suitable algorithm. OTP controller 214 is also capable of overwriting or clearing content of OTP RAM 216, such as bits of keys 218 when secure media drive 116 experiences an end of life event.

Cryptographic module 220 provides a secure computing environment within storage media controller 126, the components of which are generally not externally accessible or modifiable. Cryptographic module 220 includes cryptographic processor 222 (crypto processor 222) and cryptographic computer-readable storage media 224 (crypto CRM 224). Crypto CRM 224 includes boot ROM 226, which contains code or instructions executed by crypto processor 222 when booting (e.g., at power-on). Crypto CRM 224 also includes secure RAM 228 for loading memory images and scratch pad 230 for performing various secure operations.

Cryptographic module 220 also includes cryptographic hardware accelerators 232 (crypto accelerators 212) and key zeroizer 234. Crypto accelerators 232 are useful to perform various cryptographic operations or functions, such as those related to AES encryption, TDES encryption, secure hashing, RSA cryptography, random number generation (e.g., deterministic number generation or an entropy source), and so on. How key zeroizer 234 is implemented and used varies and is described below.

Techniques of Zeroizing an Encryption Key

The following discussion describes techniques of zeroizing (or overwriting) an encryption key. These techniques can be implemented using the previously described environment, such as key zeroizer 234 of FIG. 2 embodied on a secure-computing device 102 or secure media drive 116. These techniques include methods illustrated in FIGS. 3, 4, and 5, each of which is shown as a set of operations performed by one or more entities. These methods are not necessarily limited to the orders shown for performing the operations. Further, these methods may be used in conjunction with one another, whether performed by the same entity, separate entities, or any combination thereof. In portions of the following discussion, reference will be made to operating environment 100 of FIG. 1 and entities of FIG. 2 by way of example. Such reference is not to be taken as limited to operating environment 100 but rather as illustrative of one of a variety of examples.

Figure 3:
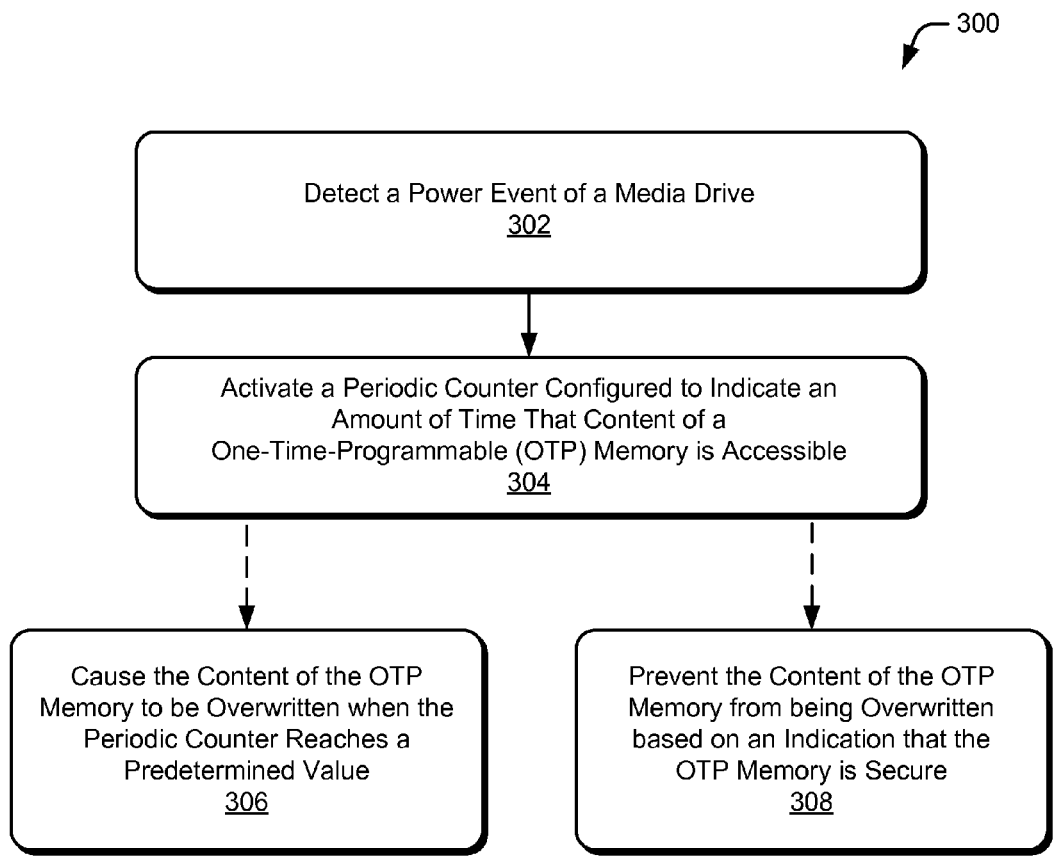
FIG. 3 illustrates a method of causing or preventing an overwriting of content of one-time-programmable (OTP) memory.

FIG. 3 depicts a method 300 for causing or preventing an overwriting of content of OTP memory, including operations performed by key zeroizer 234 of FIG. 2. Generally, method 300 allows for overwriting of OTP content when security of a secure media drive containing the OTP may be compromised.

At 302, a power event of a media drive is detected. In some cases, the power event may be a typical power-up or power-on event associated with applying power to or resetting a media drive. In other cases, the power event may be a power disruption or ripple of a power rail within the media drive. For example, one or more pins of power connector 132 may lose power resulting in a power disruption.

As an example, consider laptop computer 108 having a secure media drive 116 in the context of FIG. 2, which shows components of storage media controller 126. Assume here that laptop computer is powered-on by a user, which in turn applies power to secure media drive 116. Here, key zeroizer 234 detects the application of power to secure media drive 116 as a power-on event.

At 304, a periodic counter is activated, the periodic counter configured to indicate an amount of time that contents of an OTP memory are accessible. The periodic counter can be activated responsive to detecting a power event. The periodic counter may be an up-counter or a down-counter of any suitable size, such as a 32-bit counter. The periodic counter may be configured in any suitable fashion such as internal timing logic or logic clocked using a suitable system clock on an SoC. The OTP memory may contain any suitable data, such as a serial number of an SoC, manufacturer information, cryptographic keys, and so on.

In the context of the present example, key zeroizer 234 activates an internal counter circuit (not shown) in response to detecting the power-on event of media drive 116. Assume here that the internal counter circuit is a combination of hardwired logic that is clocked by a clock circuit formed by additional logic within key zeroizer 234.

From operation 304, method 300 may proceed to operation 306 or 308. At 306, the content of the OTP is caused to be overwritten when the periodic counter reaches a predetermined value. Some or all of the content of the OTP memory may be overwritten, such as all bits of cryptographic keys stored within the OTP memory. The OTP may be overwritten by causing an OTP controller associated with the OTP memory to overwrite bits of the content of the OTP memory. The bits of the OTP memory may all be written to a "1" value or "0" value (or any other predetermined value) effective to zeroize (or overwrite) the content of the OTP memory. Optionally, a signal may be generated upon completion of overwriting the content of the OTP memory for verification purposes.

At 308, the content of the OTP memory is prevented from being overwritten based on an indication of a secure environment. The indication may be received from a trusted source within secure media drive 116 or media storage controller 126, which indicates the security of secure media drive 116 has not been compromised. Preventing the content of the OTP from being overwritten may include deactivating the periodic counter or resetting the periodic counter. This indication is received prior to the periodic counter reaching the predetermined value; otherwise method 300 would proceed to operation 304.

Concluding the present example, assume that key zeroizer 234 receives an indication from crypto processor 222 that the integrity of secure media drive 116 has not been compromised. Also assume here that the indication is received prior to the internal counter logic of key zeroizer 234 reaching a predetermined value, which would trigger OTP controller 214 to overwrite keys 218 within OTP RAM 216.

Operations of blocks 302, 304, 306 and/or 308 may be repeated in order to ensure key security of a secure media drive. Overwriting content of OTP memory, including cryptographic keys, when an indication of a secure environment is not received, can prevent attackers or unauthorized entities from accessing the encrypted data of the storage media.

Figure 4:
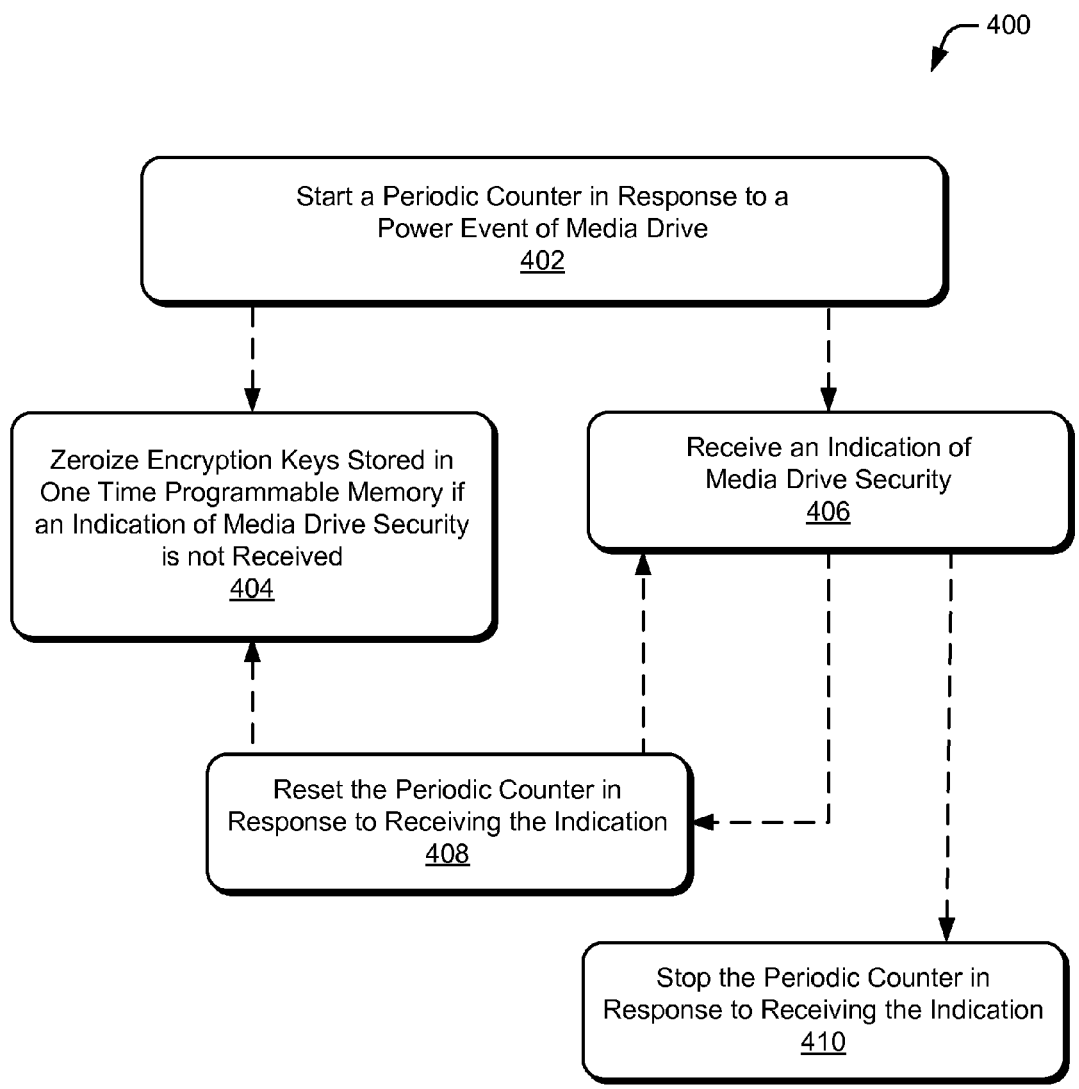
FIG. 4 illustrates a method of zeroizing keys stored in OTP memory based on a periodic counter.

FIG. 4 depicts a method 400 for zeroizing keys stored in OTP memory based on a periodic counter, including operations performed by key zeroizer 234 of FIG. 2.

At 402, a periodic counter is started in response to a power event of a media drive. The periodic counter can be configured to indicate an amount of time that an OTP memory is accessible. In some cases, the power event may be a typical power-up or power-on event associated with applying power to or resetting a media drive. In other cases, the power event may be a power disruption or ripple of a power rail within the media drive. For example, attempting to disassemble or probe secure media drive 116 may result in a power event or disruption.

As an example, consider server 104 having a secure media drive 116 in the context of FIG. 2, which shows components of storage media controller 126. Assume here that a secure media drive 116 is hot-plugged into a redundant array of independent disks (RAID) system (not shown) of server 104. Here, key zeroizer 234 detects the application of power to secure media drive 116 as a power-on event and starts an internal periodic counter (not shown). Key zeroizer 234 may also be configured to monitor pins of power connector 132 to detect a power loss when secure media drive 116 is removed from the RAID system.

From operation 402, method 400 may proceed to operation 404 or 406. At 404, encryption keys stored in OTP memory are zeroized if an indication of media drive security is not received within a predetermined amount of time. The encryption keys stored in the OTP memory may be zeroized by causing an OTP controller to overwrite all bits of encryption key. The predetermined about of time may be any suitable amount of time (e.g., 10-50 microseconds), or based on a boot or response time of a media storage controller or a cryptographic module.

At 406, an indication that the secure media drive is secure is received within the predetermined about of time. The indication may be received from a trusted entity such as a cryptographic processor executing secure boot ROM. This indication is effective to notify security components, such as key zeroizer 234, that the integrity of the secure media drive has not been compromised.

In the context of the present example, assume that key zeroizer 234 receives an indication from crypto processor 222 that integrity of secure media drive 116 has not been compromised. Assume here that crypto processor 222 is executing boot ROM 226, which includes code or instructions to verify integrity of components of secure media drive and transmit the indication to key zeroizer 234 at boot-up.

From operation 406, method 400 may proceed to operation 408 or 410. At 408, the periodic counter is reset in response to receiving the indication of media drive security. The periodic counter may be reset to a predetermined about of time or may be incremented by any suitable amount of time. Resetting the periodic counter allows re-verification of the security or integrity of a secure media drive. For example, once powered-up in a secure environment, integrity of secure media drive 116 may periodically be re-verified to prevent an unauthorized entity from attacking of probing contents the drive after bypassing the secure power-up sequence.

From operation 408, method 400 may proceed back to operation 404 or 408 as described above to implement re-verification of the integrity of secure media drive 116. Operations of blocks 404, 406, and/or 408 may be repeated iteratively to continuously ensure the security of the encryption keys once secure media drive 116 is powered-on.

At 410, the periodic counter is stopped in response to receiving the indication of media drive security. Stopping the periodic counter prevents the keys stored in the OTP from being overwritten. Once stopped, the periodic counter may be reset or re-started if another power event is detected.

Concluding the present example, assume that crypto processor 222 continuously executes a loop of code for periodically verifying the integrity of secure media drive 116 and transmitting, to key zeroizer 234, the indication that secure media drive 116 has not been compromised. Here, key zeroizer 234 will continue to reset its internal periodic counter as long as crypto processor 222 continues to iteratively transmit security indications within the predetermined amount of time as dictated by the internal periodic counter. Otherwise, key zeroizer 234 will initiate zeroization of the encryption keys within the OTP RAM 216 to protect the encrypted contents of secure media drive 116. Repeating the operations of blocks 406 and 408 may enable real-time zeroizing of the encryption keys (via operation of block 404) when a component or communication link of secure media drive 116 fails after an initial power event.

Figure 5:
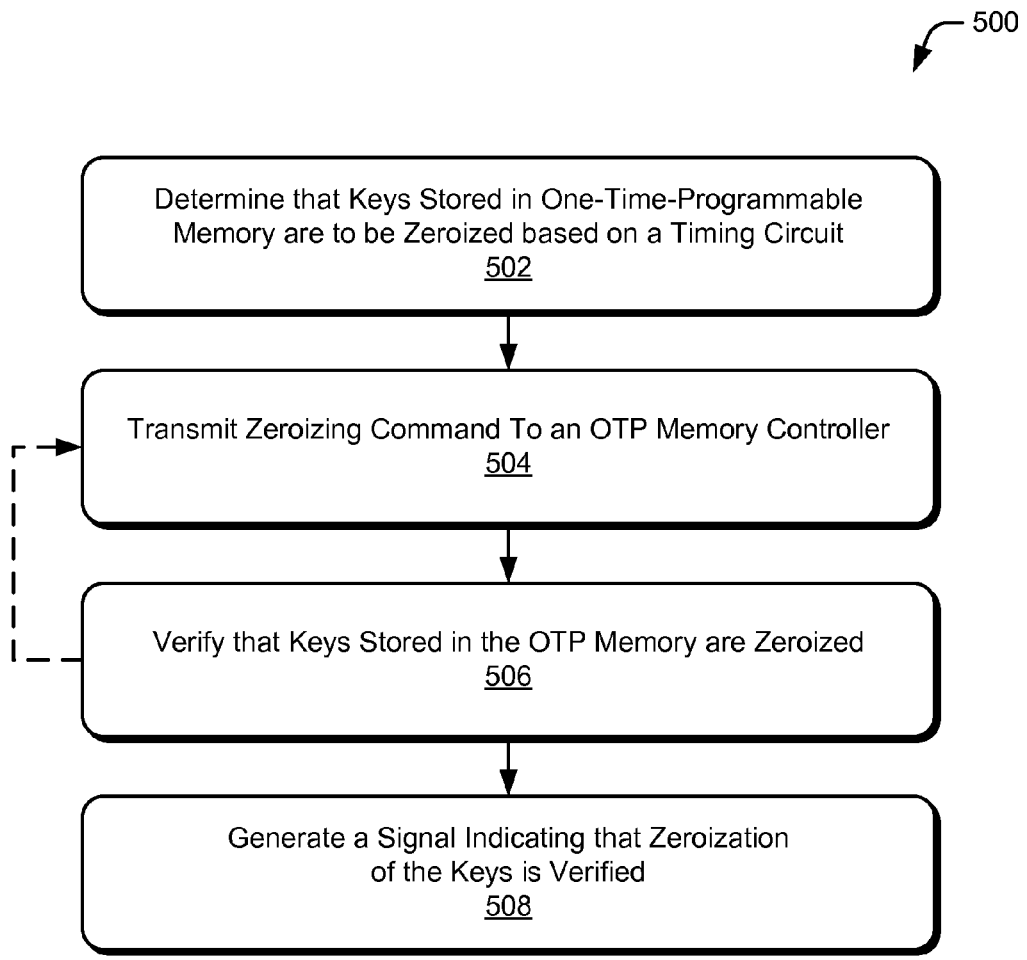
FIG. 5 illustrates a method of verifying that keys stored in OTP memory are zeroized.

FIG. 5 depicts a method 500 for verifying that keys stored in OTP memory are zeroized, including operations performed by manager 122 of FIG. 1.

At 502, it is determined, based on a timing circuit, that encryption keys stored in OTP memory are to be zeroized. This timing circuit may be activated responsive to a power-on event or a power disruption within a secure media drive. In some cases, the timing circuit may be activated in response to component failure or a loss of a communication link. Alternately or additionally, other mechanisms or actions may indicate that the encryption keys stored in the OTP memory are to be zeroized. For example, sensors monitoring voltage of various power rails of the secure drive, unauthorized access of an enclosure housing the secure media drive, or unauthorized access of a diagnostic or debugging port of a component of the secure drive may trigger zeroization of the OTP memory. In such a case, combinatorial circuits or logic can use these multiple mechanisms or actions as an input to determine the need to zeroize the encryption keys stored in the OTP memory. Using multiple input mechanisms to determine that encryption keys stored in OTP memory are to be zeroized can avoid an inadvertent zeroizing of the encryption keys.

At 504, a zeroing command is transmitted to an OTP controller associated with the OTP memory storing the encryption keys. The OTP controller is capable of overwriting or zeroing bits of the encryption keys stored in the OTP. Alternately or additionally, all of the OTP may be zeroized in addition to the bits or banks storing the encryption keys. In some cases, the encryption keys are zeroized with a hardware sequencer which, may be external to or integrated with, the OTP controller. Alternately or additionally, a flag or bit may be set indicating that zeroing of the encryption keys has been initiated.

At 506, zeroing of the encryption keys stored in the OTP is verified. Alternately or additionally, all of the OTP may be verified as being zeroized in addition to the bits or banks storing the encryption keys. Verifying that the bits of the encryption keys have been zeroized may include the use of combinatorial logic, such as OR and/or XOR gates. In some cases, a state machine that XORs all the bits of the OTP may verify that the OTP is zeroized. Verification of the zeroization of the bits of the OTP memory may be based on multiple logic circuits or hardware (e.g., XOR gates and a state machine) to ensure a false verification is avoided. Alternately or additionally, a flag or bit may be set indicating complete zeroization of the encryption keys or the entire OTP.

This flag or bit is useful to ensure that the encryption keys have been completely zeroized. For example, if a power loss occurs during the zeroization process, only the flag or bit indicating that the zeroing was initiated would be set. In this case, method 500 returns to process 504 to complete the zeroization process. Alternately or additionally, at any time a bit indicates that zeroing was initiated and another bit indicates that zeroing was not completed, zeroizing the encryption keys may be re-initialized.

At 508, a signal indicating verification of the zeroing of the encryption keys is generated. This signal may be an out-of-band (OOB) signal that is not dependent on a functional storage media controller or host interface. Generating the signal may be based on outputs of multiple logic circuits (e.g., XOR gates and/or state machine) to ensure the validity of the signal and prevent a false indication. In some cases a light-emitting diode (LED) may be illuminated to indicate verification of the zeroized encryption keys. Providing the signal OOB allows zeroization of the encryption keys to be verified when components or normal communication links of a secure media drive fail.

System-on-Chip

Figure 6:
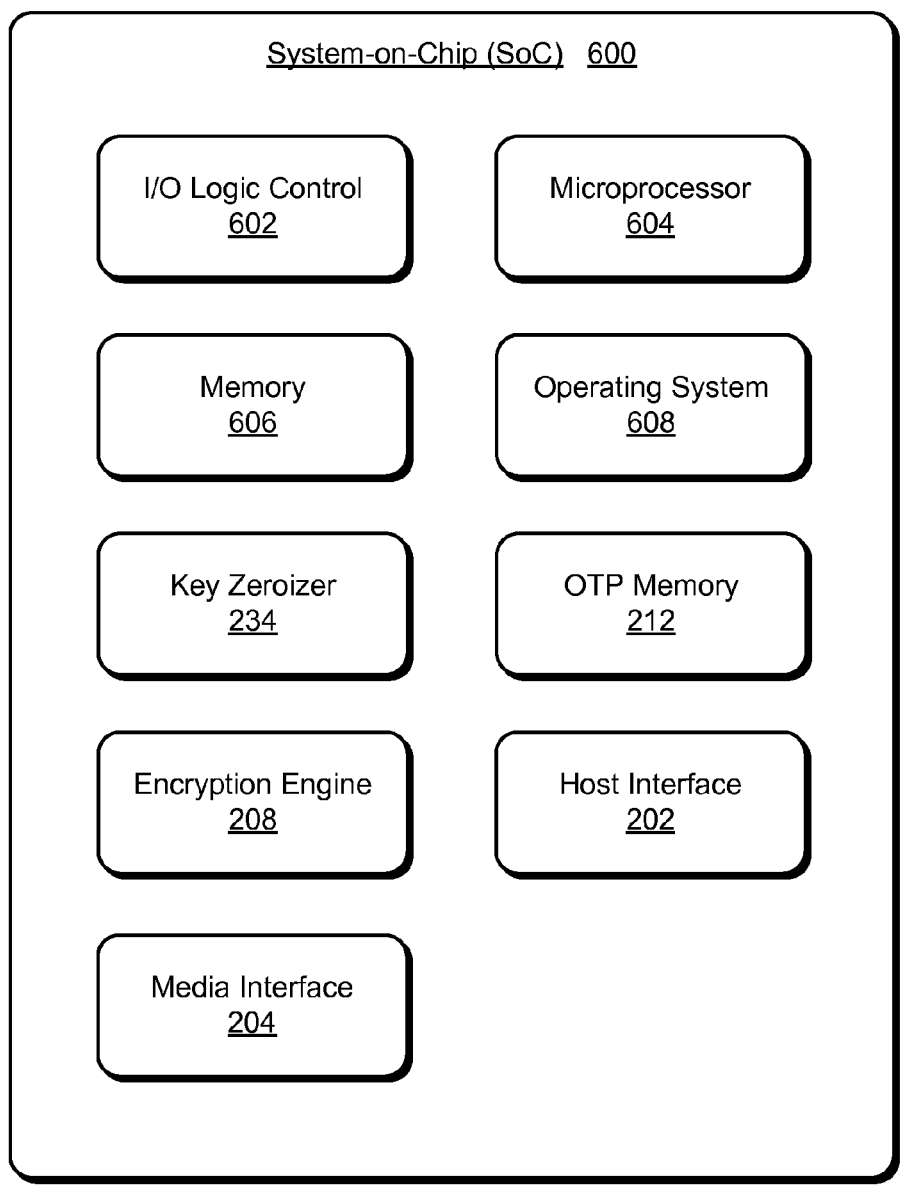
FIG. 6 illustrates a System-on-Chip (SoC) environment for implementing aspects of the techniques described herein.

FIG. 6 illustrates a System-on-Chip (SoC) 600, which can implement various embodiments described above. A SoC can be implemented in any suitable secure-computing device, such as a video game console, IP enabled television, desktop computer, laptop computer, tablet computer, server, network-enabled printer, set-top box, and/or any other type of device that may implement Ethernet connective technology.

SoC 600 can be integrated with electronic circuitry, a microprocessor, memory, input-output (I/O) logic control, communication interfaces and components, other hardware, firmware, and/or software needed to provide communicate coupling for a device, such as any of the above-listed devices. SoC 600 can also include an integrated data bus (not shown) that couples the various components of the SoC for data communication between the components. A wireless communication device that includes SoC 600 can also be implemented with many combinations of differing components. In some cases, these differing components may be configured to implement concepts described herein over a wireless connection or interface.

In this example, SoC 600 includes various components such as an input-output (I/O) logic control 602 (e.g., to include electronic circuitry) and a microprocessor 604 (e.g., any of a microcontroller or digital signal processor). SoC 600 also includes a memory 606, which can be any type of RAM, low-latency nonvolatile memory (e.g., flash memory), ROM, and/or other suitable electronic data storage. SoC 600 can also include various firmware and/or software, such as an operating system 608, which can be computer-executable instructions maintained by memory 606 and executed by microprocessor 604. SoC 600 can also include other various communication interfaces and components, communication components, other hardware, firmware, and/or software.

SoC 600 includes key zeroizer 234, OTP memory 212, encryption engine 208, host interface 202 and media interface 204 (embodied as disparate or combined components as noted above). Examples of these various components, functions, and/or entities, and their corresponding functionality, are described with reference to the respective components of the environment 100 shown in FIG. 1 and FIG. 2.

Key zeroizer 234 in SoC 600, either independently or in combination with other entities, can be implemented as computer-executable instructions maintained by memory 606 and executed by microprocessor 604 to implement various embodiments and/or features described herein. Key zeroizer 234 may also be provided integral with other entities of the SoC, such as integrated with one or both of I/O logic controller 602 or any packet-based interface within SoC 600. Alternatively or additionally, key zeroizer 234 and the other components can be implemented as hardware, firmware, fixed logic circuitry, or any combination thereof that is implemented in connection with the I/O logic control 602 and/or other signal processing and control circuits of SoC 600.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method comprising:
   detecting a power event of a media drive, the media drive securely storing encrypted data, the encrypted data decryptable using one or more plain-text keys stored in a one-time-programmable (OTP) memory of the media drive;
   activating, responsive to the detection of the power event of the media drive, a periodic counter, the periodic counter configured to cause, responsive to reaching a predetermined value that corresponds with a particular amount of time, the one or more plain-text keys stored in the OTP memory to be overwritten effective to zeroize the one or more plain-text keys; and
   deactivating, responsive to an indication that the media drive is secure and before the predetermined value is reached, the periodic counter to prevent the one or more plain-text keys stored in the OTP memory from being zeroized effective to enable access to the one or more plain-text keys for decrypting the encrypted data after the particular amount of time has elapsed.

2. The method of claim 1, further comprising, responsive to not receiving the indication that the media drive is secure and when the predetermined value is reached, overwriting the one or more plain-text keys stored in the OTP memory effective to zeroize the one or more plain-text keys preventing decryption of the encrypted data.

3. The method of claim 2, further comprising setting a first bit, the first bit indicating that overwriting of the one or more plain-text keys stored in the OTP memory has been initiated.

4. The method of claim 3, further comprising:
   receiving an indication that the one or more plain-text keys stored in the OTP have been overwritten;
   setting a second bit, the second bit indicating that the one or more plain-text keys stored in the OTP memory have been overwritten; and
   providing a signal reflecting a status of the second bit that is accessible to other entities effective to notify the other entities that the one or more plain-text keys stored in the OTP have been overwritten.

5. The method of claim 4, further comprising:
   checking the status of each of the first bit and the second bit when a subsequent power-on event of the media drive occurs; and
   overwriting any remaining content of the OTP memory if the respective bits indicate that the overwriting of the one or more plain-text keys was initiated but not completed.

6. The method of claim 4, wherein the signal is provided when a diagnostics or debugging port is disabled.

7. A media drive comprising:
   storage media comprising a computer-readable storage device;
   a media drive controller configured to access encrypted data in storage media, the media drive controller comprising:
      an encryption engine configured to encrypt data written to, and decrypt data read from, the storage media using one or more plain-text keys, the one or more plain-text keys used each time the encrypted data in the storage media is accessed,
      a one-time-programmable (OTP) memory to store the one or more plain-text keys for the encryption engine, and
      a key zeroizer configured to:
         activate, in response to a power event of the media drive, a periodic counter configured to zeroize the one or more plain-text keys after an amount of time elapses, and deactivate, in response to receiving an indication of media drive security prior to the counter reaching a predetermined value, the periodic counter to prevent the one or more plain-text keys stored in the OTP memory from being zeroized effective to enable continued access of the encrypted data of the media drive after the amount of time elapses.

8. The media drive of claim 7, wherein the key zeroizer is further configured to, in response to not receiving the indication of media drive security prior to the counter reaching the predetermined value, zeroize the one or more plain-text keys stored in the OTP memory effective to render the encrypted data of the media drive inaccessible after the amount of time elapses.

9. The media drive of claim 7, wherein the key zeroizer is further configured to verify that the one or more plain-text keys stored in the OTP memory have been zeroized.

10. The media drive of claim 9, wherein the key zeroizer is further configured to determine, in response to the power event, whether a previous act of zeroizing the one or more plain-text keys has been initiated, and if so, complete the act of zeroizing the one or more plain-text keys regardless of a status the periodic counter.

11. The media drive of claim 7, wherein the key zeroizer is further configured to zeroize the one or more plain-text keys stored in the OTP memory in response to a power system of the media drive being compromised or failure of a communication component.

12. The media drive of claim 7, wherein the one or more computer-readable storage devices include solid-state memory or magnetic media disks configured to store the encrypted data.

13. A system-on-chip (SoC) comprising:
   a first communication interface for transmitting data to, and receiving data from, a host device;
   a second communication interface for writing encrypted data to, and reading encrypted data from, encrypted storage media;
   an encryption engine to encrypt the data written to the encrypted storage media and decrypt the data read from the encrypted storage media;
   a one-time-programmable (OTP) memory storing encryption keys used by the encryption engine for encrypting or decrypting the respective data, the encryption keys stored by the OTP memory and used when the encrypted storage media is accessed; and
   a key zeroizer configured to:
      activate a periodic counter in response to a power event within an operational environment of the SoC, the periodic counter configured to cause, responsive to reaching a predetermined value, the encryption keys stored in the OTP memory to be overwritten effective to zeroize the encryption keys; and
      deactivate, in response to receiving an indication that the operational environment of SoC is secure prior to the periodic counter reaching the predetermined value, the periodic counter to prevent the encryption keys stored in the OTP memory from being overwritten effective to enable continued access to the encrypted storage media.

14. The system-on-chip of claim 13, wherein the key zeroizer is further configured to, in response to not receiving the indication that the operational environment of SoC is secure prior to the counter reaching the predetermined value, overwrite the one or more encryption keys stored in the OTP memory effective to zeroize the one or more encryption keys and prevent subsequent access of the encrypted storage media.

15. The system-on-chip of claim 14, wherein the key zeroizer is further configured to verify that the encryption keys stored in the OTP memory have been overwritten and cause a signal-output of the SoC to indicate the verification.

16. The system-on-chip of claim 15, wherein the act of verifying that the encryption keys stored in the OTP memory have been overwritten includes the use of combinatorial OR logic or an XOR-based state machine.

17. The system-on-chip of claim 13, wherein causing the encryption keys stored in the OTP memory to be overwritten includes causing the bits of encryption keys to be overwritten as either all ones or all zeros.

18. The system-on-chip of claim 13, wherein the key zeroizer is not accessible via a diagnostic or debugging data port.

* * * * *